Patented Apr. 21, 1931

1,802,073

UNITED STATES PATENT OFFICE

ARTHUR BINZ AND CURT BÄTH, OF BERLIN, GERMANY, ASSIGNORS TO SCHERING-KAHLBAUM AKTIENGESELLSCHAFT, OF BERLIN, GERMANY

2-HYDROXY-3-AMINOPYRIDINE-5-ARSONIC ACID AND THE PROCESS OF MAKING IT

No Drawing. Application filed January 17, 1929, Serial No. 333,237, and in Germany January 18, 1928. Renewed February 19, 1931.

This invention relates to a method of preparing new pyridine arsenic compounds especially aminopyridine arsenic compounds and consists in treating with reducing agents nitropyridine-beta-arsonic acids in which the arsonic acid group is in the 3- or 5-position and the nitro group in the 5- or 3-position respectively. The new method is especially suitable for directly or indirectly preparing 3-aminopyridine-5-arsonic acids or 5-aminopyridine-3-arsonic acids by reduction of the corresponding nitropyridine-beta-arsonic acids.

When treating nitropyridine-beta-arsonic acids with reducing agents which act in an alkaline reacting medium, such as sodium hydrosulfite dissolved in or ferrous hydroxide suspended in alkali-metal hydroxide solution, alkali metal hydrosulfide or ammoniumhydrosulfide, sodium amalgam or the like, the nitro group of the starting material is directly converted into the amino group, without reducing the arsonic acid group. The arsonic acids thus obtained may be purified by reduction into the corresponding arseno compounds, which are then re-oxidized to the arsonic acids.

When using reducing agents which act in an acid reacting medium such as stannous chloride, mixtures of iron with inorganic acids and the like, not only is the nitro group of the starting material reduced to the amino group, but the arsonic acid group is also reduced to the arseno group. The diaminopyridine-beta-arseno compound thus obtained is converted into the corresponding arsonic acid compound by oxidation.

The new method is not only suitable for the treatment of simple nitropyridine-beta-arsonic acids but is especially adapted for the treatment of substituted nitropyridine-beta-arsonic acids. Thus for example 2-hydroxy-3-nitropyridine-5-arsonic acid is converted on reduction into the therapeutically valuable, bactericidal 2-hydroxy-3-aminopyridine-5-arsonic acid.

The following examples illustrate the production of compounds according to the invention.

1. 66 g. of 2-hydroxy-3-nitropyridine-5-arsonic acid are dissolved in 600 ccm. of water and 50 ccm. of 10 normal sodium hydroxide solution and the solution cooled to about $-1°$ C. 130 g. of pure sodium hydrosulfite are quickly added to the cooled solution with vigorous stirring. The solution becomes colourless and the temperature rises to about 30° C; if the reaction mixture is not cooled before adding the sodium hydrosulfite, decomposition of the reaction product formed may take place, and some arseno compounds may be formed resulting in lower yields of the corresponding arsonic acid. Air is passed through the colourless solution, until the hydrosulfite not used for the reduction is completely decomposed by oxidation. This is the case, when a sample remains clear and does not show sulfur precipitation when adding hydrochloric acid.

The solution of 2-hydroxy-3-aminopyridine-5-arsonic acid obtained may be purified by reducing the arsonic acid group to the arseno group and converting the arseno compound after washing into the arsonic acid compound by oxidation. For this purpose 200 ccm. of concentrated hydrochloric acid are added to the solution obtained by the above described reduction and the dissolved sulfur dioxide driven out by passing carbon dioxide through the solution, which is then decolourized by treatment with animal charcoal. The decolourized solution containing the 2-hydroxy-3-aminopyridine-5-arsonic acid is treated in the cold with 10 g. of potassium iodide and 100 g. of 50% hypophosphorous acid, in order to precipitate 2.2'-dihydroxy-3.3'-diamino-5.5-arseno pyridine by reduction. The latter is separated from the liquid, carefully washed out and oxidized, for example by treatment with 10% hydrogen peroxide solution under ice-cooling in order to avoid decomposition. The solution of 2-hydroxy-3-aminopyridine-5-arsonic acid thus obtained is decolourized by treatment with animal charcoal. By addition of 20 ccm. of concentrated hydrochloric acid the arsonic acid obtained is converted into its hydrochloride. This hydrochloride solution is then concentrated in a nitrogen atmosphere at a pressure as much as possible below atmospheric pressure. The crystalline hydrochloride of the 2-hydroxy-3-amino-5-arsenopyridine obtained may be further purified by recrystallization from water.

To an aqueous solution of this hydrochloride the amount of sodium hydroxide necessary for neutralizing the hydrochloride is added. The 2-hydroxy-3-aminopyridine-5-arsonic acid obtained on neutralization is crystallized out as white crystals, melting under decomposition at temperatures of about 228-229° C. The yield is about 70% of theory.

The reaction takes place according to the following equation:

2. 26.4 g. of 2-hydroxy-3-nitropyridine-5-arsonic acid are dissolved in 400 ccm. of methyl alcohol and 400 g. of 4% sodium amalgam are added. The reaction mixture is heated under a reflux condenser, until the generation of hydrogen ceases. The mercury is separated from the liquid and the latter heated under reduced pressure in order to expel the methyl alcohol. The solid residue contains the 2-hydroxy-3-aminopyridine-5-arsonic acid, which may be purified in the same manner as described in example 1.

3. To a boiling solution of 750 g. of ferrous sulfate in 3000 ccm. of water 180 g. of sodium hydroxide dissolved in 900 ccm. of water are added with stirring. 70 g. of 2-hydroxy-5-nitropyridine-3-arsonic acid dissolved in 700 ccm. of water containing 20 g. of sodium hydroxide are added to the reaction mixture with stirring. The mixture obtained is boiled for about five minutes and then filtered, in order to separate the solution from the iron hydroxide sludge. The solution of 2-hydroxy-5-aminopyridine-3-arsonic acid obtained may be worked up in the same manner as described in example 1, for the 2-hydroxy - 5 - aminopyridine-3-arsonic acid.

The reaction takes place according to the following equation:

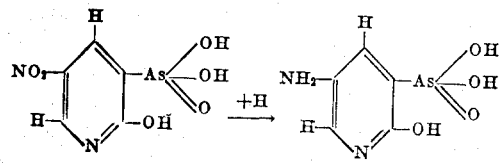

4. 26.4 g. of 2-hydroxy-3-nitropyridine-5-arsonic acid are dissolved in 500 ccm. of 10% hydrochloric acid and 140 g. of stannous chloride dissolved in 600 ccm. of concentrated hydrochloric acid are gradually added in the cold. The mixture is then stirred and heated for some time to about 60° C. On diluting with about 1000 ccm. of water 2.2'dihydroxy-3.3'-diamino-5.5'arsenopyridine is precipitated. The precipitated arseno compound is washed and oxidized to the arsonic acid in the same manner as described in Example 1.

The reaction takes place according to the following equation:

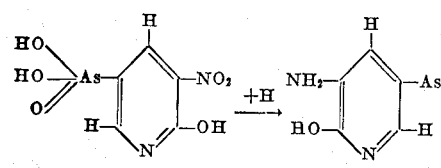

5. 24.8 g. of 3-nitropyridine-5-arsonic acid are dissolved in 240 ccm. of water and 20 ccm. of 10 normal sodium hydroxide solution. The solution is cooled to $-1°$ C. and 65 g. sodium hydrosulfite are added with stirring. Air is passed through this solution, until a sample remains clear on addition of hydrochloric acid. Hydrochloric acid is then added to the solution until it reacts acid to Congo paper and the dissolved sulfur dioxide is expelled by passing carbon dioxide through the solution. The solution may then be decolourized by treatment with animal charcoal after which 20 g. of acetic acid anhydride are added with stirring. After standing for about 3 hours 3-acetylaminopyridine-5-arsonic acid is precipitated. This compound is saponified by dissolving it in hydrochloric acid containing methyl-alcohol heating the solution. The methyl alcohol is removed by evaporation and the residue recrystallized from water when the hydrochloride of 3-amino-pyridine-5-arsonic acid is obtained as a white crystalline powder, soluble with difficulty in alcohol, insoluble in other organic solvents, soluble in water and easily soluble in sodium hydroxide and sodium carbonate solution, from which the free acid may be prepared.

The reaction takes place according to the following equation:

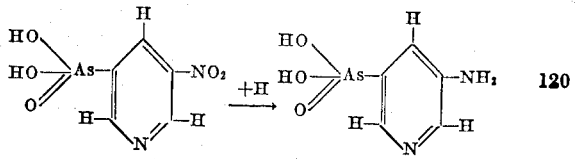

The result obtained according to the invention is surprising, as it was to be expected, that the basic character of the pyridine nucleus would influence the stability of the union between the arsenic atom and the pyridine nucleus, thus replacing the arsonic acid group by hydrogen. We have, however, found, that this is not the case and that the amino compounds obtained are very stable.

We claim:—

1. Method of preparing aminopyridine arsenic compounds comprising the step of treating nitropyridine-beta-arsonic acids, in which the nitro group is in the meta position to the arsonic acid group, with reducing agents.

2. Method of preparing aminopyridine arsonic acids comprising the step of treating nitropyridine-beta-arsonic acids, in which the nitro group is in the meta position to the arsonic acid group with reducing agents in an alkaline reacting medium.

3. Method of preparing aminopyridine arsonic acids comprising the step of treating substituted nitropyridine-beta-arsonic acids in which the nitro group is in the meta position to the arsonic acid group with reducing agents in an alkaline-reacting medium.

4. Method of preparing aminopyridine arsonic acids comprising the step of treating alpha-substituted nitropyridine-beta-arsonic acids, in which the nitro group is in the meta position to the arsonic acid group with reducing agents in an alkaline-reacting medium.

5. Method of preparing aminopyridine arsonic acids comprising the step of treating alpha-hydroxy-nitropyridine-beta-arsonic acids, in which the nitro group is in the meta position to the arsonic acid group, with reducing agents in an alkaline-reacting medium.

6. Method of preparing 2-hydroxy-3-aminopyridine-5-arsonic acid comprising the step of treating 2-hydroxy-3-nitropyridine-5-arsonic acid with reducing agents in an alkaline-reacting medium.

7. Method of preparing 2-hydroxy-3-aminopyridine-5-arsonic acid comprising the steps of treating 2-hydroxy-3-nitropyridine-5-arsonic acid with reducing agents in an alkaline-reacting medium, reducing the arsonic acid obtained to the corresponding arseno compound, washing the arseno compound obtained and oxidizing the washed arseno compound to the corresponding arsonic acid.

8. Method of preparing 2-hydroxy-3-aminopyridine-5-arsonic acid, which consists in treating a solution of 2-hydroxy-3-nitropyridine-5-arsonic acid in aqueous alkali-metal hydroxide solution with a reducing agent, reducing the 2-hydroxy-3-aminopyridine-5-arsonic acid obtained to the corresponding arseno compound by treatment with a reducing agent in an acid-reacting medium, washing the 2.2'-dihydroxy-3.3'-diaminopyridine-5.5'-arseno compound obtained and oxidizing the washed arseno compound to the corresponding arsonic acid.

9. Method of preparing 2-hydroxy-3-aminopyridine-5-arsonic acid, which consists in treating a cooled solution of 2-hydroxy-3-nitropyridine-5-arsonic acid in aqueous alkali-metal hydroxide solution with a reducing agent, reducing the 2-hydroxy-3-aminopyridine-5-arsonic acid obtained to the corresponding arseno compound by treatment with a reducing agent in an acid-reacting medium in the cold, washing the 2.2'-dihydroxy-3.3'-diaminopyridine-5.5'-arseno compound precipitated out with water and oxidizing the washed arseno compound to the corresponding arsonic acid by treatment with hydrogen peroxide in the cold.

10. As new products aminopyridine-beta-arsonic acids, in which the amino group is in the meta position to the arsonic acid group, the compounds being crystalline solids.

11. As a new product 2-hydroxy-3-aminopyridine-5-arsonic acid as a white crystalline bactericidal solid which melts under decomposition at temperatures of about 228–229° C.

In testimony whereof we affix our signatures.

ARTHUR BINZ.
CURT RÄTH.